Oct. 6, 1959                E. V. GARNETT                2,907,473
                            VEHICLE DERRICK
Filed Sept. 30, 1955                              6 Sheets-Sheet 2
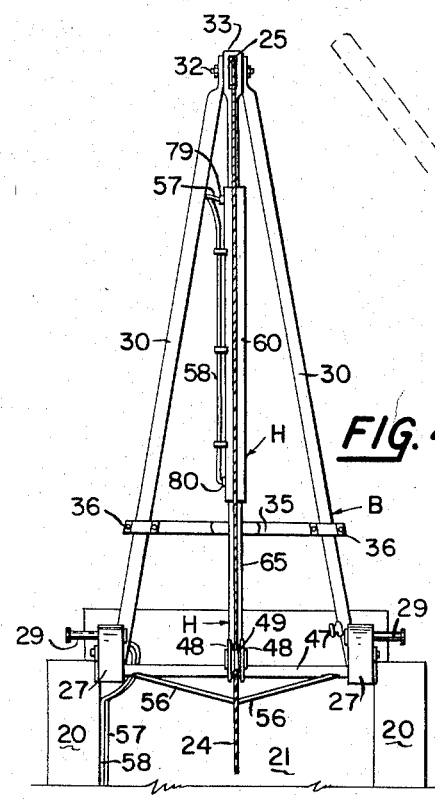
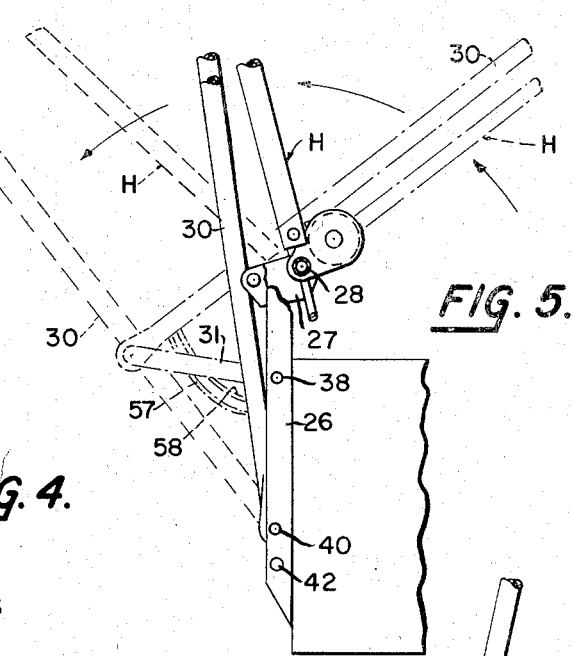
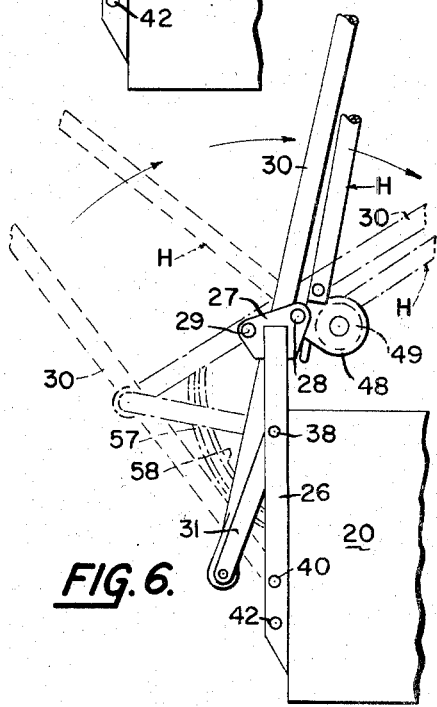
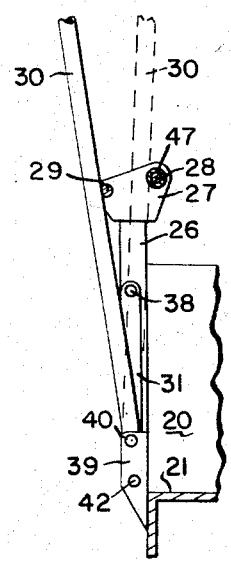
INVENTOR.
EDWARD V. GARNETT
BY
ATTORNEY Oct. 6, 1959      E. V. GARNETT      2,907,473
VEHICLE DERRICK Filed Sept. 30, 1955      6 Sheets-Sheet 3

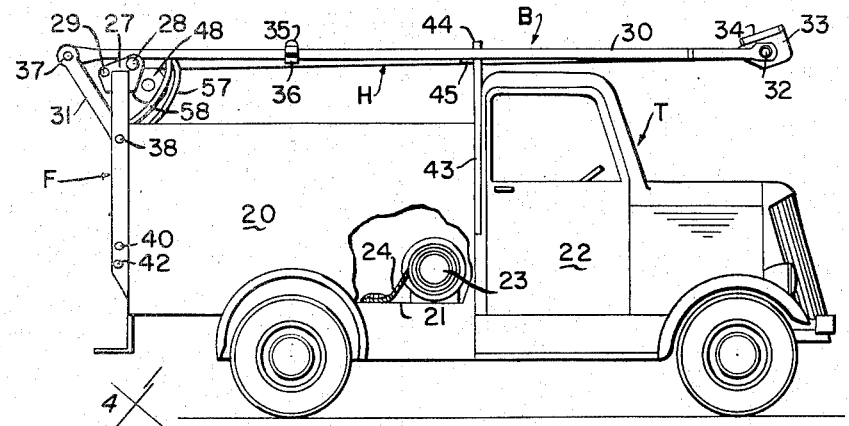

INVENTOR.
EDWARD V. GARNETT
BY
Horace B. Van Valkenburgh
ATTORNEY

Oct. 6, 1959 E. V. GARNETT 2,907,473
VEHICLE DERRICK
Filed Sept. 30, 1955 6 Sheets-Sheet 4

INVENTOR.
EDWARD V. GARNETT
BY
Horace B. Van Valkenburgh
ATTORNEY

Oct. 6, 1959    E. V. GARNETT    2,907,473
VEHICLE DERRICK

Filed Sept. 30, 1955    6 Sheets-Sheet 5

INVENTOR.
EDWARD V. GARNETT
BY
ATTORNEY

Oct. 6, 1959     E. V. GARNETT     2,907,473
VEHICLE DERRICK

Filed Sept. 30, 1955     6 Sheets-Sheet 6

INVENTOR.
EDWARD V. GARNETT
BY
Homer B. Van Valkenburgh
ATTORNEY

United States Patent Office 2,907,473
Patented Oct. 6, 1959

2,907,473

VEHICLE DERRICK

Edward V. Garnett, Denver, Colo., assignor to Truck Equipment Company, Denver, Colo., a corporation of Colorado Application September 30, 1955, Serial No. 537,764

2 Claims. (Cl. 212—8)

This invention relates to derricks, and more particularly to a derrick which is especially adapted to be mounted upon a truck or other vehicle as a portable unit, thereby relating to the subject matter of the Edward V. Garnett and George N. Gromer U.S. Patent No. 2,715,014, granted August 9, 1955 and entitled "Vehicle Derrick." Thus, numerous features of the aforesaid U.S. Patent 2,715,014 will be found in a preferred embodiment of the present invention, which in its entirety may be considered as an improvement thereover, although certain features of the present invention may be utilized in other types.

In the aforesaid U.S. Patent No. 2,715,014, the manner in which the previous types of derricks utilized as a portable unit, such as for handling telephone poles and the like, were deemed to require improvement is pointed out and need not be repeated here. The improved derrick of the aforesaid U.S. Patent No. 2,715,014 may include an upright frame mounted on a vehicle, such as a truck, at one end thereof, a boom which extends from the bottom of the frame outwardly from the end of the vehicle in operating position and lying above the frame and over the vehicle in storage position, and a link having one end pivotally connected to the base of the boom and the other end pivotally connected to the frame at an intermediate position. Such improved derrick may further include means adjacent the top of the frame, such as a transverse shaft or the like, for at least partially supporting the boom, means for urging the boom past dead center as the boom moves between storage position over the vehicle and operating position outwardly from the end of the vehicle, as well as means for urging the boom past dead center as the boom moves between operating and storage positions.

While the improved derrick (described above rather briefly, reference being made to the aforesaid Patent No. 2,715,014 for additional details necessary for a more complete understanding), is highly satisfactory in operation and use, there are numerous advantages in each of erection, storage and operation of a derrick which have been found to be attainable by the use of a principal feature of the improvement of the present invention, which includes a hydraulic device, preferably a double-acting hydraulic cylinder.

Thus, among the objects of the present invention are to provide a novel vehicle derrick which includes a hydraulic device; to provide such a derrick in which the hydraulic device is double acting; to provide such a derrick in which the hydraulic device coacts with other parts in a novel manner; to provide such a derrick in which use of a lifting cable is unnecessary for erecting or storing operations; to provide such a derrick which increases the ease and facility with which erecting and storing may be effected; to provide such a derrick in which the hydraulic device may be utilized in conjunction with a lifting cable for lifting and moving operations; to provide such a derrick in which the power of the hydraulic device may be utilized effectively; to provide such a derrick which is especially adapted for use as a pole derrick, used for the placing and pulling of telephone and light poles and the like; to provide such a derrick in which the hydraulic device may be used so as to reduce stress on other parts; to provide such a derrick which may exist in more than one form; to provide at least one such form which is adapted to be utilized in loading articles into or out of a vehicle on which the derrick is installed; and to provide such a derrick which, in general, is simple, economical, sturdy and rugged in construction and is adapted for different types of use and for installation on different types of vehicles.

Additional objects of this invention and the novel features thereof, will become apparent from the description which follows, taken in connection with the accompanying drawings, in which:

Fig. 1 is a side elevation of a panel type truck and a derrick, constructed in accordance with this invention and forming one embodiment thereof, mounted on the truck and pivotally attached to the rear end thereof, with the derrick boom shown in a flat or storage position over the truck and with portions of the truck being broken away to show certain parts otherwise hidden from view;

Fig. 2 is a fragmentary side elevation, showing the rear portion of the truck of Fig. 1, with the derrick boom extending rearwardly from the truck in an operating, or use position;

Fig. 3 is a rear elevation of the truck and derrick, as shown in Fig. 2;

Fig. 4 is a fragmentary top plan view, showing the rear end of the truck and the derrick in a position lowered from the position of Fig. 2;

Fig. 5 is a fragmentary side elevation of a rear portion of the truck and showning various positions of the derrick boom during movement from storage to use positions;

Fig. 6 is a fragmentary side elevation similar to Fig. 5, but showing various positions of the derrick boom during movement from use or operating position to storage position;

Fig. 7 is a fragmentary vertical section, taken along line 7—7 of Fig. 3 but on an enlarged scale, showing the derrick boom in a nearly upright position, with another position of the boom indicated in dotted lines;

Figure 8:
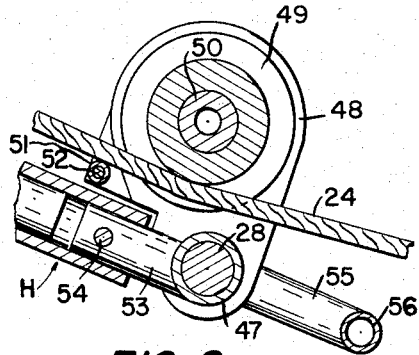
Fig. 8 is a fragmentary cross section, on an enlarged scale, taken along line 8—8 of Fig. 3.

A derrick of the present invention, similar to the derrick of the aforesaid Patent No. 2,715,014 and as shown in Figs. 1–3, may include a boom B and may be mounted upon a truck T, of a conventional type which includes side panels 20 upstanding from the bed 21 rearwardly of the operators' cab 22. A power winch 23 is mounted upon the bed 21 behind the cab 22 with a hoisting cable 24 wound thereon and adapted to be extended and threaded over a sheave 25 of Fig. 3, mounted at the upper end of the boom. The derrick D includes a frame F which may be attached to the rear ends of the panels 20 and on which the boom B is mounted in a manner which permits it to extend outwardly and rearwardly therefrom when in use, as in Fig. 2, to be swung over the top thereof to a flat position over the truck, above the panels 20 and cab 22 for storage, as in Fig. 1, and to be swung back again to the rear position for subsequent use.

The frame F, as in Figs. 1–3, may include a pair of upright angle bars 26, one leg of each of which extends rearwardly and the other leg of each is attached to the rear upright edge of a side panel 20. It will be understood that the side panel construction of the truck is sufficiently rigid to withstand the operative strains and stresses encountered with the derrick in operation, but that the angles 26 may be suitably braced or reinforced in any suitable manner. The top of each angle 26 extends above the top of the side panel 20 to which it is attached and at its upper end is mounted a bracket 27, a portion of which extends forwardly from the angle 26 (that is, toward the forward end of the truck) to carry a transverse shaft 28 which is received in a transverse aperture in each bracket and which extends across the truck forwardly of the angles. Shaft 28 may also be termed a draw bar, because of its use in moving the boom between operating and storage positions. Another portion of each bracket 27 extends rearwardly of the angle 26, and is provided with a transversely extending orifice at a level slightly below that of the transverse shaft 28. A pin 29 is slidably mounted in each of these orifices, and is movable outwardly or inwardly within the bracket to clear or to engage the boom in a manner hereinafter described.

The boom B may be formed as a simple A-frame and includes a pair of legs 30 which are connected at the top and spaced apart at the base for attachment to the angles 26 through links 31, as hereinafter described. The upper ends of the legs 30 may be flattened, and provided with aligned holes through which a pin 32 extends to connect the upper ends of the legs 30 together and also to provide a shaft or pin for sheave 25 and a housing 33, mounted between the legs at the apex, as in Figs. 4 and 9, at the upper end of a hydraulic device H. The sheave 25 may be of any desired type and is conveniently enclosed within housing 33 which on the front side may be provided with a pair of guide rollers 34, mounted at each side of the housing in position to engage the cable as it passes to and from the sheave. The legs 30 of the boom may be formed of pipe or tubing, as is also a central reinforcing brace 35 which extends between the legs 30 and may be connected to each leg by a clamp 36.

The base of each leg 30 is preferably flattened and sized, and provided with a hole therethrough for a bushing 37, or other suitable hollow reinforcement, to provide a pivot connection point with one end of a link 31, each bushing being conveniently attached to a link. The other end of each link 31 is pivotally connected by a pin 38 to the rearwardly extending flange of an angle 26 at a medial position thereon. A reinforcing bracket, engaging the opposite end of pin 38, may be welded to the transverse leg of each angle 26, if desired. The length of links 31 is such that the base of the legs 30 will be near the bottom of the frame F and against the angles 26 with the boom in an inclined operative position extending rearwardly from the truck T, as in Fig. 2, and also such that the legs 30 may be swung upwardly to place the boom in a flat storage position extending forwardly along the top of the truck, as in Fig. 1. As in Fig. 3, a reinforcing bracket 39 may be welded to each angle 26 and parallel with the rear flange thereof, so that the pivotal connection between a leg 30 and link 31 will lie between the bracket 39 and the flange of angle 26 with the boom in operative position. Aligned holes 40, as in Fig. 1, extend through the flange of angle 26 and bracket 39, and in said operating position register with the hole in the link bushing 37, so that each leg of the boom may be locked to the truck by a removable pin 41, as in Fig. 3, which may be attached to a chain to prevent loss thereof. Also, a tubular bushing 42 may extend between the flange of angle 26 and bracket 39, so a shaft may be placed in bushings 42 to permit the cable 24 to be used as a drag line. During transportation or non-use, the boom lies in storage position over the truck. In this position, as shown in Fig. 1, the links 31 are swung upwardly and the legs 30 of the boom near the base may be supported by the forwardly offset, transverse shaft 28, which thus provides a support for the boom, while the apex of the boom extends over the forward end of the truck with the legs 30 near the apex resting upon the upper, transversely disposed portion of an inverted, U-shaped bracket 43 mounted at a forward position on the truck, such as by attachment to the front ends of the panels 20. A pair of ears 44 may upstand from the center of the upper portion of bracket 43, with a spacing therebetween suitable to contact or nearly contact the hydraulic device H on each side thereof and thereby prevent lateral shifting of the boom when resting on the bracket, as during movement of the truck. A pair of angle lugs 45 may also be mounted in spaced positions atop bracket 43, as in Fig. 3, to support boom legs 30, as in Fig. 1. The foregoing is, of course, similar to the construction of the aforesaid Patent No. 2,715,014, although numerous variations therein are permissible, including the use of a boom having one principal leg and one or more auxiliary legs or longitudinal braces.

In accordance with the present invention, a double-acting hydraulic device H is connected between the upper end of boom B, as at housing 33, and the rearwardly offset shaft 28, although preferably disconnectible from the latter for purposes hereinafter described. As in Figs. 4 and 8, the hydraulic device H may be pivotally connected to shaft 28 through a sleeve 47 which surrounds shaft 28 and is provided at its center with a pair of laterally spaced, normally upstanding brackets 48 between which a guide sheave 49 for cable 24 rotates on a pin 50, which may be solid or tubular as shown. Cable 24, as in Fig. 8, conveniently engages the underside of guide sheave 49 so as to extend along hydraulic device H to upper sheave 25, while a guide roller 51 may be mounted on a pin 52 extending between the brackets 48, as to prevent cable 24 from rubbing on hydraulic device H when the boom is in a relatively low operating position, as in Fig. 12. A tubular base 53, to which the lower end of hydraulic device H may be removably attached, as by a pin 54, may extend forwardly from sleeve 47 between brackets 48 and on one side of the sleeve 47 with a reinforcing tube 55 extending in the opposite direction on the other side of sleeve 47. Laterally extending, angular braces 56 may be connected at their inner ends to reinforcing tube 55 and at their outer ends to sleeve 47 adjacent the outer ends of the latter. Brackets 48 are conveniently welded to sleeve 47, while base 53 is also conveniently welded to sleeve 47 and to brackets 48 and welding is also conveniently utilized to join reinforcing tube 55 to sleeve 47 and to join braces 56 to tube 55 and sleeve 47, although any other suitable type of connection may be utilized. Hydraulic fluid may be supplied to and from hydraulic device H in any suitable manner, as by a pair of hoses 57 and 58, which conveniently extend through one of the boom legs 30. Hoses 57 and 58 may extend along one of the side panels 20 from a suitable conventional valve mechanism (not shown) which is conveniently controlled from inside the cab 22 and may be connected to a pump and a reservoir, again of conventional construction and therefore not shown. Hoses 57 and 58 also may extend from a position on the side panel 20 at an elevation approximately the elevation of pin 38 for link 31, as in Figs. 3, 5 and 6, to enter the hollow leg 30 at a point spaced above the lower end, as in Figs. 5 and 6. The hoses pass inside the boom leg 30 to an appropriate point near the upper end thereof, as in Fig. 4, for connection to the hydraulic device H. At the lower end of leg 30, sufficient slack is left in the hoses 57 and 58 to accommodate movement of the boom to its various positions, while at the upper end of leg 30, sufficient slack is left in the hoses to accommodate relative movement between legs 30 and the hydraulic device H.

In further accordance with this invention, the boom is moved from the storage position to the operating position, by the hydraulic device H in a simple, relatively effortless manipulation. The first step of such operations is to move pins 29 inwardly, if not already in such position. In pulling the boom upwardly and then rearwardly from the storage position to the operating position, the boom will be in succeeding positions illustrated in Fig. 5, moving in the direction of the arrows. Commencing with the boom resting on the bracket 42 and sleeve 47, the storage position of Fig. 1, the hydraulic device H is retracted to pull the boom upwardly with legs 30 sliding along sleeve 47 and then engaging pins 29, as in the dash position of Fig. 5. As the boom moves downwardly and rearwardly, links 31 will pivot downwardly, and pins 29 will cause the boom to "break" over the top to an upright position. The weight of the boom will then cause the boom and links 31 to slide downwardly to the full position of Fig. 5. Then, the hydraulic device H is operated in the opposite direction, i.e., extended, whereupon the boom is permitted to fall rearwardly, as to the dotted position of Fig. 5. Then, pins 41 may be inserted to hold the boom in the desired position for use, it being noted that the boom may be shifted to any desired angular position by extending or retracting the hydraulic device H.

In accordance with this invention, the boom is also moved from operating position to storage position by a simple, relatively effortless manipulation through hydraulic device H. Pins 41 are, of course, removed and pins 29 are shifted outwardly to the position of Fig. 4, if not already in that position. Then, hydraulic device H is retracted and the boom is moved upwardly, as from the dotted position of Fig. 6 toward the full position thereof. As the boom approaches an upright position, as when moving between the full position and the dotted position of Fig. 7, the forward component of the pull of hydraulic device H, due to the forward spacing of the shaft 28 and sleeve 47 from the vertical centerline of link pivot pins 38, will pull the boom forwardly against sleeve 47. Then, the weight of the boom, the center of gravity of which will be above shaft 28 and forwardly thereof when the boom engages sleeve 47, will cause the lower end of the boom and links 31 to shift to the full position of Fig. 6, as the hydraulic device H is further retracted. The hydraulic device H may then be moved in the opposite direction, i.e., extended, to permit the boom to fall slowly to the storage position of Fig. 1. After the boom reaches the storage position, pins 29 are preferably moved inwardly, so that they will not form lateral projections while the truck is moving, as through traffic, from one point to another. As will be evident from Fig. 1, in the storage position, with the hydraulic device H resting on bracket 42 and between ears 44, the boom legs 30 will be slightly above the hydraulic device, due to the distance between the centerline of shaft 28 and the top of sleeve 47 as well as the normally greater diameter of hydraulic device H than boom legs 30. Thus, the lugs 45, each of which may be provided with a horizontal flange at its upper end to provide a greater bearing surface, will support boom legs 30 in such position.

Figure 9:
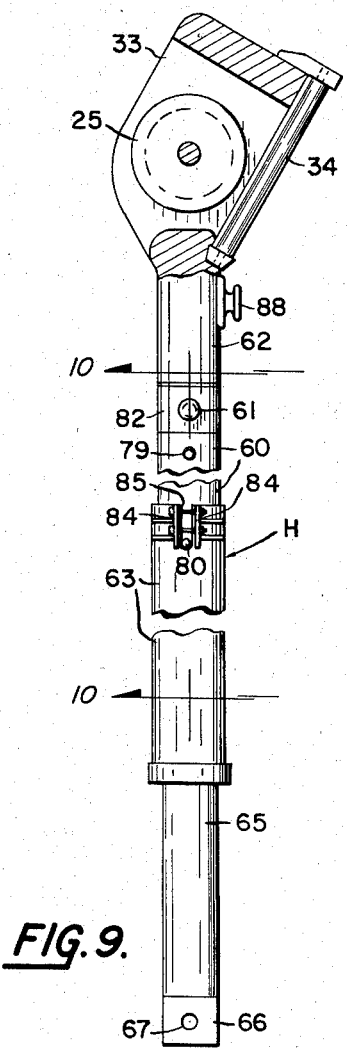
Fig. 9 is a condensed side elevation, with the sheave end in longitudinal section, of a hydraulic boom leg, which includes a double acting hydraulic cylinder.
Figure 10:
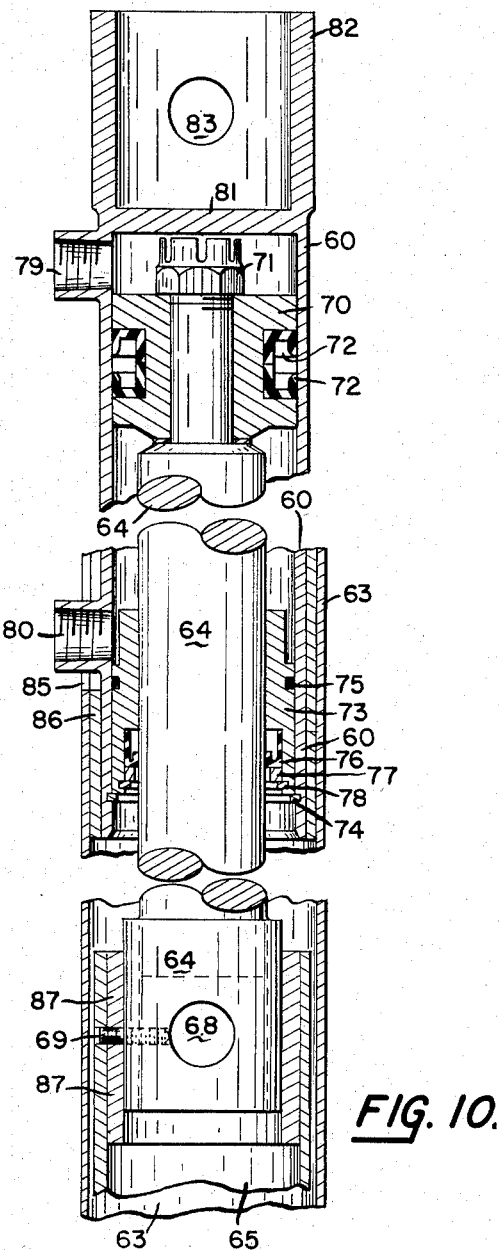
Fig. 10 is a condensed longitudinal section, on an enlarged scale, taken along line 10—10 of Fig. 9.

The hydraulic device H may be constructed in any suitable manner, but the construction of the hydraulic device H illustrated in Figs. 9 and 10 does have particular advantages. Thus, as in Fig. 9, the hydraulic device H may include an inverted cylinder 60, the base of which is connected by a pin 61 to a tube 62 which extends from the upper sheave housing 33, with the opposite end of the cylinder extending into a guiding and protective sleeve 63, which encloses piston rod 64, shown in Fig. 10, to prevent the entrance of foreign material and accumulation thereof on the piston rod, which might cause undue wear of packing and other parts. The extending end of piston rod 64 may be attached to a connecting tube 65 having a tubular bracket 66 at its opposite end and provided with diametrically opposed holes 67 for removable attachment thereof by pin 54 to the base 49 of Fig. 8, while piston rod 64 may be attached to connecting tube 65 by a pin 68, as in Fig. 10, conveniently held in position by a set screw 69. The piston rod 64 may be chrome plated or otherwise treated for long wear and smooth operation and extends, of course, within cylinder 60 to a piston 70, which may be attached to piston rod 64 in a conventional manner, as by a nut 71. Piston 70 may be provided with a circumferential groove in which packing 72 may be conventionally disposed, while at its opposite end, cylinder 60 may be provided with a bushing 73 which is held in position by a snap ring 74. Bushing 73 may be provided with an exterior groove to accommodate an oil ring 75 engaging the inner circumference of the cylinder 60, while suitable shaft packing 76 may be held in position in bushing 73 by a steel washer 77, the latter being retained in position by a snap ring 78. At one end, cylinder 60 may be provided with a nipple 79 for connection of hose 54 thereto and at its opposite end with a nipple 80 for connection of hose 55 thereto, while the normally upper end of cylinder 60 may be closed by a cap 81. Also, cylinder 60 may be provided at its normally upper end with a short tube 82, as in Fig. 10, provided with diametrically opposed holes 83 therein, for pin 61 of Fig. 9. Sleeve 63 may be clamped to cylinder 60, as by bolts extending between reinforced bracket arms 84 on opposite sides of a slot 85, through which nipple 80 extends, while a reinforcing sleeve 86 may be provided between cylinder 60 and sleeve 63 and a reinforcing sleeve 87 between piston rod 64 and connecting tube 65. Any suitable method may be used in attaching the various fixed parts together, such as welding to attach cap 81 and short tube 82 to cylinder 60, as well as nipples 79 and 80 thereto, and to attach reinforcing sleeve 86 to the inside of sleeve 63 and reinforcing sleeve 87 to the inside of connecting tube 65, as well as to attach brackets 84 and reinforcing legs therefor to sleeve 63. As will be evident, particularly when short tube 82 at the exposed end of cylinder 60 and tubular bracket 66 at the exposed end of connecting tube 65 have the same diameter, the cylinder and piston arrangement may readily be reversed. Also, other cylinder and piston constructions may be utilized.

As in Fig. 4, hose 57 may be connected directly to nipple 79 of cylinder 60, while hose 58 may be attached to cylinder 60 in any suitable manner, as by clips, as shown, for passage along cylinder 60 to nipple 80. As in Fig. 9, cylinder connecting tube 62 may be provided with a lug or rope hook 88 adjacent housing 33, while one boom leg 30, as in Fig. 3, may be provided with a similar lug or rope hook 89, each for a purpose hereinafter described.

Figure 11:
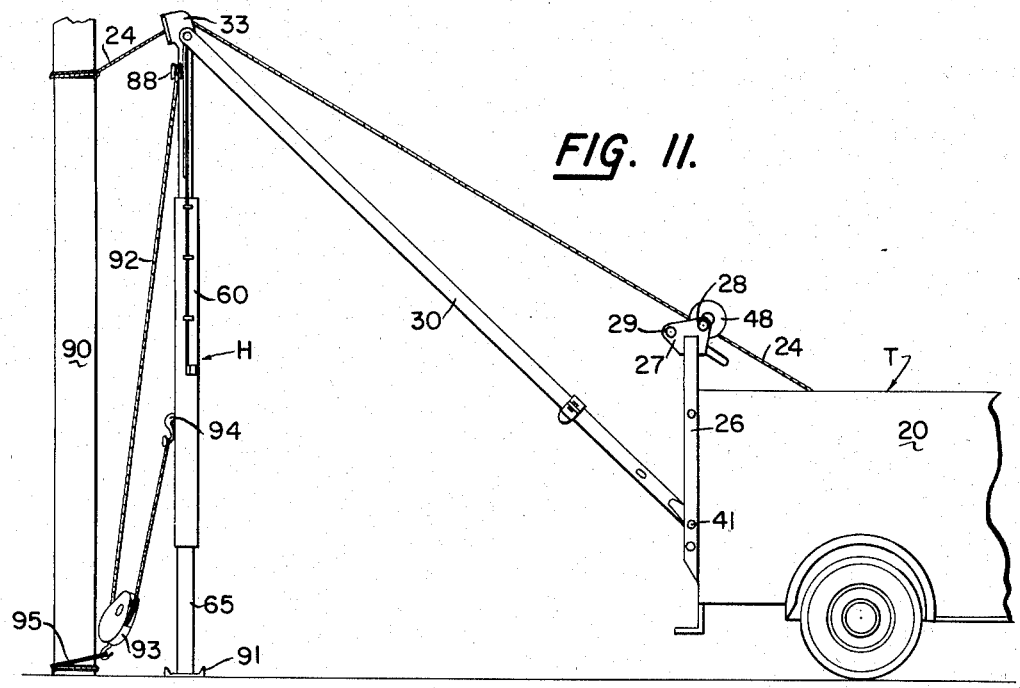
Fig. 11 is a fragmentary side elevation similar to Fig. 2 but on a reduced scale, showing the hydraulic device used in pulling poles or similar operations.

When the derrick of this invention is utilized in pulling poles, such as a pole 90 of Fig. 11, the hydraulic device H is preferably disconnected at its lower end, as by removing pin 54 of Fig. 8. Also, while the hydraulic device H is being disconnected and swung down to the position of Fig. 11 the boom legs 30 may be supported by the winch cable 34, the free end of which may be attached to rope hook 89 of Fig. 3 and the cable then tightened to hold the boom in fixed position. When the hydraulic device H is swung down to the position of Fig. 11, preferably a ground engaging device such as a channel 91, is utilized so that the end of the hydraulic device will not be pushed into the ground, the lateral area of the plate 91 or a similar device being preferably sufficient that a firm support for the lower end of the device H is provided. After the hydraulic device H is actuated so as to support the boom, the winch cable 24 may be loosened and removed from the hook 89, shown in Fig. 3, then attached to the pole 90 at a position adjacent housing 33, so as to steady the pole during pulling and suspend the pole at the housing 33 after it is pulled from the ground. For pulling the pole, the power of hydraulic device H is utilized, which will normally be greater than the pull which can be exerted on cable 24 from the winch, particularly with the boom in extended position. Thus, a pulling cable 92 may be attached at one end to the rope hook 88 and passed through a block 93, then up to an auxiliary hook 94, which may be secured to the hydraulic device H. An auxiliary cable 95 may be wrapped around the pole 90 adjacent the ground and attached to block 93, so that when hydraulic device H is extended, cable 92 will tighten in block 93 and cable 95 will also tighten around pole 90, after which substantially the full force exerted within hydraulic device H will be applied to pole 90. Due to the considerable pressure which may be produced within the hydraulic device H, the pole is readily pulled from the ground, usually without the necessity of excavating around the same.

Figure 12:
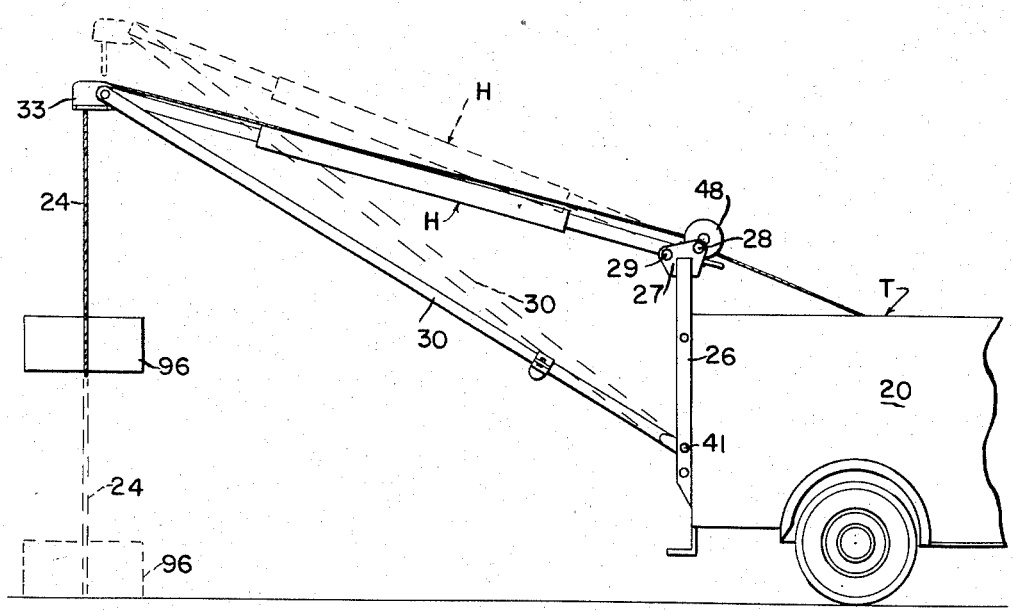
Fig. 12 is a fragmentary side elevation similar to Fig. 8, but showing the hydraulic device used in conjunction with a lifting cable in lifting heavy articles.

A further use of the hydraulic device H is shown in Fig. 12, wherein the boom legs 30 are disposed at a relatively small angle with respect to ground level and a load 96 is to be handled. With the load 96 resting on the ground, cable 24 may be attached thereto and the load lifted off the ground, as by retracting the hydraulic device H, as to move the hydraulic device and boom from the full to the dotted positions of Fig. 12. This movement of the hydraulic device will start the load moving upwardly, after which the winch cable 24 may be pulled in to continue the upward movement of the load. The hydraulic device and boom may either remain in the dotted position of Fig. 12, or be moved to any other desired position, such as the full position, in accordance with the extension or retraction, as the case may be, of the hydraulic device H. As will be evident, hydraulic device H may be utilized for shifting the boom from one position to another while a load is being carried, in numerous other ways than that described above in connection with Fig. 12.

Figure 13:
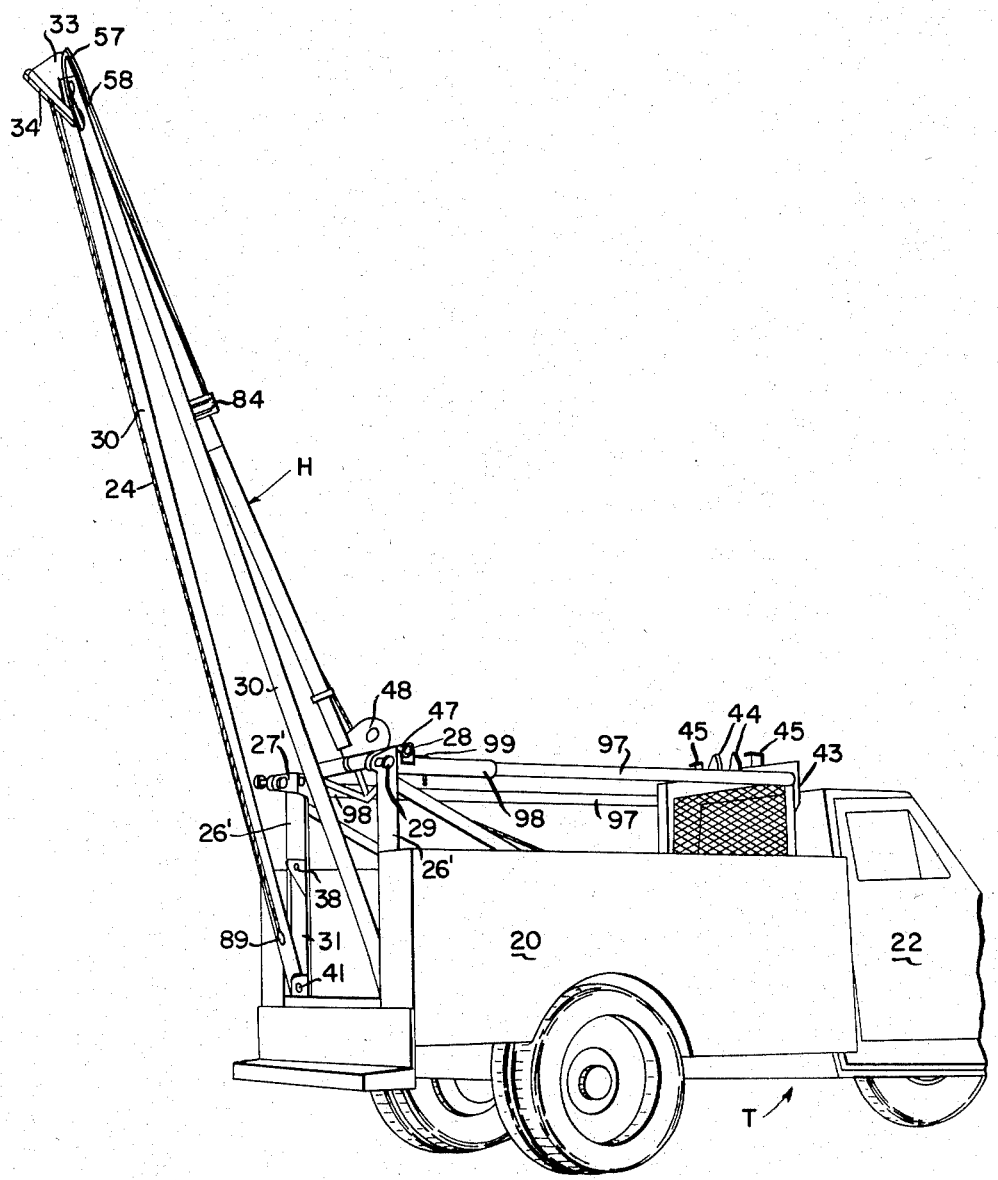
Fig. 13 is a perspective view of a modification of the derrick of Fig. 1, particularly adapted to be utilized in loading articles into the vehicle on which the derrick is installed.
Figure 14:
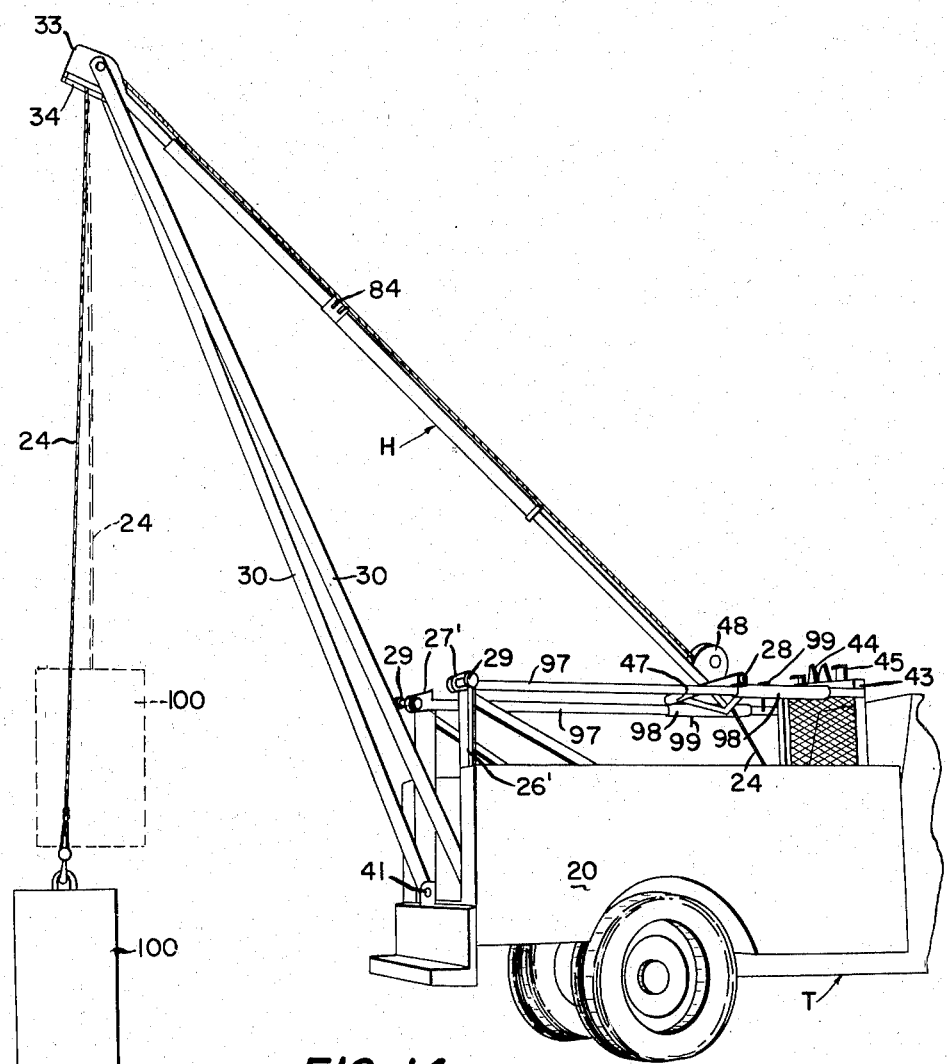
Fig. 14 is a similar perspective view, illustrating an initial position of the parts of the derrick of Fig. 13 when starting to load an article into the vehicle.

The alternative embodiment of this invention, illustrated in Figs. 13 and 14, is particularly adapted to be utilized in loading articles into or out of the vehicle. The boom legs 30 and links 31 are similar to those of the previous embodiment, but the frame which includes supports 26' may be slightly different in that the shaft 28 is not carried directly by a bracket, but the bracket 27' at the upper end of each support or angle 26' carries only one of the pins 29. A support for shaft 28, such as a tubular rail 97, may extend from the upper end of each angle 26' to the front bracket 43, although rails 97 may be supported in any other suitable manner. Each of the opposite ends of shaft 28 may be mounted on a slide 98, conveniently tubular so as to surround a rail 97 and being movable thereon, as from the rear position of Fig. 13 to the forward position of Fig. 14. Each slide 98 is normally retained in position, on the corresponding rail 97, by a removable pin 99. For moving shaft 28 and the slides 98 from the rear position of Fig. 13 to the forward position of Fig. 14, the free end of the winch cable 24 may be attached to rope hook 89 at a lower position on one of the legs 30 and the cable tightened to hold the boom in position. Then, pins 99 may be removed and the hydraulic device H extended to force the slides 98 to the position of Fig. 14, after which the pins 99 may be reinserted. The center brace 35 of the boom should be removed by disconnecting clamps 36 from the boom legs 30, while the pins 29 should be placed in an outwardly extending position, if not already there. Since the boom legs 30 are supported in fixed position by the hydraulic device H, the winch cable 24 may be released and detached from the rope hook 89, then attached to a load 100, as in Fig. 14. Cable 24 then may be pulled in by the winch to lift the load, as to the dotted position of Fig. 14. After the load has been lifted to a position which is at or above the level of the bed 21 of the truck T, the hydraulic device H may be retracted until the boom legs 30 are in substantially vertical position, then further retracted until the boom legs 30 extend in a forward direction and the load 100 assumes a position near or above the point in the truck or vehicle at which it is to be placed. Then, the cable winch may be actuated to cause the cable 24 to lower load 100 onto the vehicle bed. For unloading articles from the vehicle bed, the boom legs 30 and hydraulic device H may be over the bed with each side 98 moved rearwardly and held in that position on rail 97 by pin 99. The free end of winch cable 24 may be attached to the load and the load lifted, after which the reverse of the loading operations is performed. Thus, the hydraulic device may be extended so that the boom legs 30 will pivot from a position above the bed of the vehicle, past a substantially vertical position, and then rearwardly of the vehicle, as in Fig. 14, after which the load may be lowered to the ground, placed on another vehicle or placed in any other desired position.

What is claimed is:

1. A derrick for a truck having a cable winch mounted thereon, comprising an upright frame mounted at one end of the truck and including a pair of vertically extending supports at each side, a bracket at the upper end of each support and a shaft extending between said brackets in a position offset from the center of said support toward said winch; a pin mounted for lateral horizontal movement in each said bracket at a position offset from the center of said bracket in a direction away from said winch, said pins being movable inwardly and outwardly; a boom including a pair of hollow legs connecting at their upper ends and diverging to their lower ends, the lower ends of said legs being flattened and provided with pivot holes; a pair of links, each said link being pivotally attached at one end to a support at an intermediate position and at the opposite end to the lower end of a boom leg; a bushing having a central hole therethrough pivotally connecting the said opposite end of each link with the lower end of the corresponding boom leg; a removable pin for attaching each said bushing to said support and thereby pivotally attach the lower ends of said boom legs to said supports; a sleeve surrounding said shaft; a reinforcing tube extending outwardly from said sleeve in a normally downward direction and an attachment tube extending from said sleeve in the opposite direction; a tubular brace extending laterally from the end of said reinforcing tube to each end of said sleeve; a pair of plates extending in parallel relation and outwardly from said sleeve at a normally upper position, said plates being attached to said sleeve and to said attachment tube; a cable pulley and a guide roller rotatably mounted between said plates; a double acting hydraulic device having at each end an attaching tube; a housing having a pulley rotatably mounted on a transverse pin adjacent one end thereof and an attachment tube extending from the opposite end thereof, said pin pivotally connecting said housing to the upper ends of said boom legs; a removable pin for connecting said sleeve attachment tube to one of said hydraulic means attaching tubes in telescoping relation; means for connecting said housing attachment tube to the other of said hydraulic means attaching tubes in telescoping relation; hoses for supplying hydraulic fluid to opposite ends of said cylinder extending within one of said hollow legs of said boom, from a point adjacent the lower end thereof to a point adjacent the upper end thereof, one hose being connected to the upper end of said cylinder and the other hose extending along said cylinder in attached relation to the lower end of said cylinder; an inverted U-shaped bracket having an upper horizontal cross bar mounted on said truck in spaced position from said supports, said boom resting on said sleeve and on said horizontal bracket bar in storage position, said bar being provided with spaced upstanding ears in a central position to receive said hydraulic device therebetween, said winch cable extending in engagement with said sleeve pulley and around said housing pulley, at least one leg of said boom and said hydraulic device being provided with a hook for attachment of the free end of said cable.

2. A derrick for a truck having a cable winch mounted thereon comprising an upright frame mounted at one end of the truck and including a pair of vertically extending supports at each side; a boom including a pair of hollow legs connected at their upper ends and diverging to their lower ends, the lower ends of said legs being flattened and provided with pivot holes; a pair of links, each said link being pivotally attached at one end to a support at an intermediate position and at the opposite end to the lower end of a boom leg; a bushing having a central hole therethrough pivotally connecting the said opposite end of each link with the lower end of the corresponding boom leg; a removable pin for attaching each said bushing to said support and thereby pivotally attach the lower ends of said boom legs to said supports; a tubular rail extending horizontally from the upper end of each said frame support, said rails being parallel and extending generally in the direction of said winch; a tubular slide surrounding each said rail; a removable pin for attaching each said slide to the corresponding rail in different positions; a shaft extending transversely of said rails and mounted on said slides; a sleeve surrounding said shaft; a reinforcing tube extending outwardly from said sleeve in a normally downward direction and an attachment tube extending from said sleeve in the opposite direction; a tubular brace extending laterally from the end of said reinforcing tube to each end of said sleeve; a pair of plates extending in parallel relation and outwardly from said sleeve at a normally upper position, said plates being attached to said sleeve and to said attachment tube; a cable pulley and a guide roller rotatably mounted between said plates; a double acting hydraulic device having at each end an attaching tube; a housing having a pulley rotatably mounted on a transverse pin adjacent one end thereof and an attachment tube extending from the opposite end thereof, said pin pivotally connecting said housing to the upper ends of said boom legs; a removable pin for connecting said sleeve attachment tube to one of said hydraulic means attaching tubes in telescoping relation; means for connecting said housing attachment tube to the other of said hydraulic means attaching tubes in telescoping relation; hoses for supplying hydraulic fluid to opposite ends of said cylinder extending within one of said hollow legs of said boom, from a point adjacent the lower end thereof to a point adjacent the upper end thereof, one hose being connected to the upper end of said cylinder and the other hose extending along said cylinder in attached relation to the lower end of said cylinder; an inverted U-shaped bracket having spaced vertical legs and an upper horizontal cross bar mounted on said truck in spaced position from said supports, said boom legs resting on said sleeve and on said horizontal bracket bar in storage position, said bar being provided with spaced upstanding ears in a central position to receive said hydraulic device therebetween and the ends of said rails opposite said frame being attached to said bracket vertical legs; said winch cable extending to engage said sleeve pulley and around said housing pulley, at least one leg of said boom and said hydraulic device each being provided with a hook for attachment of the free end of said cable.

References Cited in the file of this patent

UNITED STATES PATENTS

| | | |
|---|---|---|
| 2,550,185 | Busch | Apr. 24, 1951 |
| 2,687,810 | Hurst | Aug. 31, 1954 |
| 2,687,811 | Hurst | Aug. 31, 1954 |
| 2,701,649 | Hallstrom | Feb. 8, 1955 |
| 2,715,014 | Garnett et al. | Aug. 9, 1955 |
| 2,740,536 | Bill | Apr. 3, 1956 |
| 2,838,182 | Brown | July 10, 1958 |